(12) United States Patent
Uthappa

(10) Patent No.: US 10,417,229 B2
(45) Date of Patent: Sep. 17, 2019

(54) DYNAMIC DIAGONAL SEARCH IN DATABASES

(71) Applicant: SAP SE, Walldorf (DE)

(72) Inventor: Mandanna Mandechanda Uthappa, Bangalore (IN)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/633,757

(22) Filed: Jun. 27, 2017

(65) Prior Publication Data

US 2018/0373759 A1   Dec. 27, 2018

(51) Int. Cl.
*G06F 16/00*  (2019.01)
*G06F 16/2453*  (2019.01)
*G06F 16/951*  (2019.01)

(52) U.S. Cl.
CPC .... *G06F 16/24542* (2019.01); *G06F 16/2454* (2019.01); *G06F 16/24549* (2019.01); *G06F 16/951* (2019.01)

(58) Field of Classification Search
CPC ............ G06F 16/24542; G06F 16/2454
USPC ................................... 707/718, 713
See application file for complete search history.

(56) References Cited

U.S. PATENT DOCUMENTS

| 8,155,949 | B1 | 4/2012 | Rubin |
| 8,892,540 | B2 | 11/2014 | Walker et al. |
| 9,405,794 | B2 | 8/2016 | Prakash et al. |
| 2003/0016748 | A1* | 1/2003 | Hwang ............ H04N 5/145 375/240.12 |
| 2004/0098203 | A1 | 5/2004 | Rognes |
| 2005/0182760 | A1* | 8/2005 | Lee ............ G06F 16/334 |
| 2006/0026147 | A1 | 2/2006 | Cone et al. |
| 2006/0287980 | A1 | 12/2006 | Liu et al. |
| 2012/0143847 | A1* | 6/2012 | Seo ............ G06F 16/24561 707/718 |
| 2013/0275451 | A1* | 10/2013 | Lewis ............ G06Q 10/063 707/758 |
| 2015/0095303 | A1 | 4/2015 | Sonmez et al. |
| 2017/0032038 | A1 | 2/2017 | Relkin et al. |

OTHER PUBLICATIONS

W.S. Martins, J.B. Del Cuvillo, F.J. Useche, K.B. Theobald, G.R. Gao; A Multithreaded Parallel Implementation of a Dynamic Programming Algorithm for Sequence Comparison; Pacific Symposium on Bio-computing; 2001; p. 1-12; University of Delaware; Newark; USA; (Located Via Google—https://psb.stanford.edu/psb-online/proceedings/psb01/martins.pdf).

* cited by examiner

*Primary Examiner* — Thu Nguyet T Le
(74) *Attorney, Agent, or Firm* — Fish & Richardson P.C.

(57) ABSTRACT

A query identifier is generated for a query received in a database. The received query identifier is matched with query identifiers stored in a dynamic table. It is determined whether an execution plan is available based on matching the query identifiers in the dynamic table. For the matching query identifier, it is determined whether dynamic search criteria are met. Upon determining that the dynamic search criteria are met, a memory address corresponding to the query identifier is retrieved from the dynamic table. Based on the available diagonal search execution plan, the dynamic diagonal search is performed in the table from the memory address to retrieve search result. The dynamic diagonal search involves incrementing a data pointer to access the memory address in a diagonal manner in the table.

20 Claims, 11 Drawing Sheets

| QUERY ID 202 | TABLE ID 204 | MEMORY ADDRESS 206 | TABLE MODIFIED 208 | SEARCH SUCCESSFUL 210 | COUNT 212 |
|---|---|---|---|---|---|
| QID2 214 | RV_TB 216 | X0005 218 | NO 220 | YES 222 | 1 224 |

FIG. 2

| COUNTRY 402 | POPULATION 404 | SALES GROWTH % 406 | AREA OF MAX GROWTH 408 |
|---|---|---|---|
| INDIA 410 (X0001) | 300 (X0002) | 5 (X0003) | DELHI 426 (X0004) |
| JAPAN (X0005) | 200 414 (X0006) | 40 428 (X0007) | TOKYO (X0008) |
| NEPAL (X0009) | 150 430 (X0010) | 20 418 (X0011) | DAMAK (X0012) |
| CHINA 432 (X0013) | 280 (X0014) | 55 (X0015) | BEIJING 422 (X0016) |

DYNAMIC DIAGONAL SEARCH IN DATABASES

FIELD

Illustrated embodiments generally relate to data processing, and more particularly to dynamic diagonal search in databases.

BACKGROUND

Typically, search engines follow horizontal search in row store databases, or vertical search in column store databases. In the row store databases, complete table scanning of a table takes place row-by-row, and in the column store databases complete table scan takes place column-by-column. In a database table, search is optimized if a primary key is generated in the database table. Further, an optimized search is achieved if the search is performed on the field associated with the primary key. Also, search is optimized if index is generated in the database table. The optimized search is achieved if the search is performed on the indexed field in the database table. It is challenging to identify a search optimization technique that can be used on a database table that neither has a primary key defined nor an index defined. Further, it is challenging to identify a search optimization technique that will be compatible with both row store databases and column store databases.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2 shows an exemplary dynamic table, according to one embodiment.

FIG. 4 shows an exemplary table illustrating search in a database, according to one embodiment.

DETAILED DESCRIPTION

Embodiments of techniques for dynamic diagonal search in databases are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
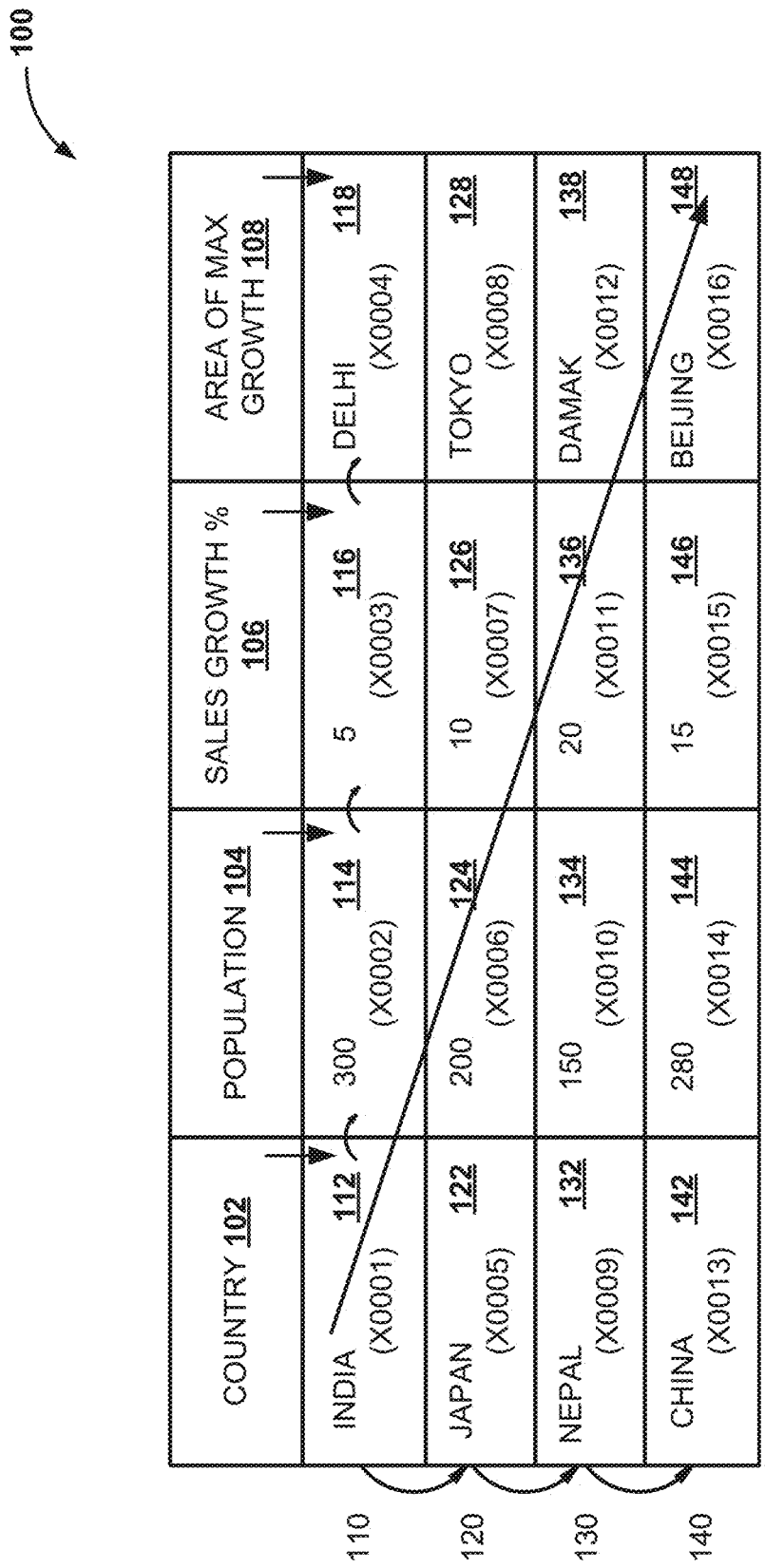
FIG. 1 shows an exemplary database table, according to one embodiment.

FIG. 1 shows an exemplary table 100, according to one embodiment. The table 100 represents a revenue table 'RV_TB' with fields organized by columns such as country 102, population 104, sales growth % 106 and area of max growth 108. The revenue table 100 has row 110 with values such as country 'India' 112, population '300' 114, sales growth % '5' 116 and area of max growth 'Delhi' 118. Similarly, row 120 with values such as country 'Japan' 122, population '200' 124, sales growth % '10' 126 and area of max growth 'Tokyo' 128. Row 130 with values such as country 'Nepal' 132, population '150' 134, sales growth % '20' 136 and area of max growth 'Damak' 138. Row 140 has values such as country 'China' 142, population '280' 144, sales growth % '15' 146 and area of max growth 'Beijing' 148. The table 100 may be stored in a primary storage or volatile memory such as random access memory (RAM), or may be stored in a secondary storage such as hard disc drive. In either case, individual values in the table 100 are stored in corresponding memory locations that are identified by memory addresses. For example, value such as country 'India' 112 is stored in memory address X0001', population '100' 114 is stored in memory address 'X0002', sales growth % '5' 116 in memory address 'X0003' and area of max growth 'Delhi' 118 in memory address 'X0004'. Similarly, values in row 120, 130 and 140 are stored in corresponding memory locations identified by memory addresses.

When a row search is performed on the table 100, values stored in the table 100 are searched or scanned by individual rows in a sequential manner. For example, a query is received as shown below:

---
SELECT * FROM "RV_ TB" WHERE COUNTRY= 'INDIA' AND POPULATION= '200' AND SALES = '20' AND AREA= 'BEIJING' ....(Q1)

---

In response to the received query, when a row search or scan is performed, row 110 is searched or scanned first such as 'India' 112 (X0001), '100' (X0002), '5' (X0003) and 'Delhi' 118 (X0004), followed by scanning of the row 120, row 130 and row 140 in a sequential manner. While performing the sequential row scan, a data pointer pointing to a memory address of a value is sequentially incremented by '1'. In the sequential row scan of table 100, to scan from the first value 'India' 112 (X0001) to the last value 'Beijing' 148 (X0016), the data pointer is sequentially incremented by '1' to move from the first memory location 'X0001' to the last memory location 'X0016'. This results in '15' sequential movements of the data pointer to complete the scan from the first memory location 'X0001' to the last memory location 'X0016'. The row search or scan did not result in successful search result.

In response to the received query, when a column search or scan is performed, column country 102 is searched or scanned such as 'India' 112 (X0001), 'Japan' (X0005), Nepal (X0009), and China (X0013). Second column population 104, third column sales growth % 106 and fourth column area of max growth 108 are scanned in parallel with the first column country 102. While performing the parallel column scan, a data pointer pointing to a memory address of a value is incremented by '1'. In the column scan of table 100, to scan from the first value 'India' 112 (X0001) until the last value 'China' 142 (X0013) in the column country 102, the data pointer is incremented by '1' for every movement from the memory location X0001 to X0013. Similarly, the data pointer is incremented by '1' in the remaining columns. This results in '12' movements of the data pointer to complete the scan from the first memory location 'X0001' to the last memory location 'X0016'. The column search or scan does not result in successful search result.

In one embodiment, in response to the received query, a diagonal search or diagonal scan is performed, such as 'India' 112 (X0001), '200' (X0006), '20' (X00011) and 'Beijing' (X0016). While performing the diagonal search or scan, a data pointer pointing to a memory address of a value is incremented by '5'. For diagonal search, increment of the data pointer is dynamically determined based on the size of the table or the number of columns in the table. For example, data pointer increment is '5' because the number of the columns in table 100 is '4'. Initially memory address 'X0001' is scanned and the data pointer is incremented by '5' to scan the next memory address 'X0006'. Similarly, memory locations 'X00011' and 'X0016' are scanned by incrementing the data pointer by '5'. Scan from memory address 'X0001' to 'X0006' is considered as '1' movement or '1' jump by the data pointer. By incrementing the data pointer by '5', diagonal search of table 100 requires '3' movements of the data pointer from the memory address 'X0001' to 'X0016'. The diagonal search or scan did not result in successful search result.

Diagonal search of the table 100 takes '3' movement of the data pointer to complete the scan of the entire table in comparison to the row scan that took '15' movement or column scan that took '12' movement of the data pointer to complete the scan of the entire table. In the example illustrated above, diagonal scan of the table takes '5' times lesser time than row or column scan, resulting in faster table scan. Further, though the table 100 neither has a primary key defined nor index defined, the diagonal scan of the table results in faster scan in comparison to row or column scan. The diagonal search may be applied on the table with different number of columns and rows. The number of columns or rows does not restrict the diagonal search in any way.

FIG. 2 is an exemplary dynamic table 200, according to one embodiment. Whenever a search query is received in a database, information corresponding to the search query is generated, and stored in the dynamic table 200. The dynamic table 200 has various columns such as query ID 202, table ID 204, memory address 206, table modified 208, search successful 210 and count 212. When a search query as shown below:

SELECT*FROM "RV_TB" WHERE
COUNTRY='JAPAN' (QID2)

is received in the database, information corresponding to the search query is stored in the dynamic table 200. Consider the above query 'QID2' received in the table 100 'RV_TB' (FIG. 1). The search query is identified by a query ID such as 'QID2', and the table is identified by a table ID such as 'RV_TB'. Query 'QID2' 214 and table ID 'RV_TB' 216 are stored in the dynamic table 200. Query ID may be automatically generated based on the table queried and the conditions in the 'where' clause. When search query 'QID2' is received in the database for the first time, the search query is executed in the database using default search logic, and based on the execution, additional information is generated and stored in the dynamic table 200. An execution plan is an ordered set of steps to access data in a database. For example, the execution plan provides information such as how data is accessed, types of joins used, type of filtering or sorting used, primary keys and foreign keys accessed, estimated time for individual operation, etc. The database is packaged with a set of default execution plans to access or query the database. The default search logic is provided by the default execution plans. A diagonal search execution plan may be provided as a plugin or add-on to the default execution plans. Diagonal search logic is provided by the diagonal search execution plan. The default search execution plan may be available in a search engine and the diagonal search execution plan may be provided as a plugin or add-on in the search engine. The query 'QID2' is executed using the default search logic and the result of the execution is recorded in the dynamic table 200. When the search query QID2 is executed for the first time, value 'no' is stored in field 220 of the table modified 208 column. The table is deemed modified if there are records inserted, deleted, updated or defragmented. The search query 'QID2' is executed and the 'where' clause country='JAPAN' is identified in the memory address 'X0005', and a successful search result is obtained. The memory address 'X0005' 218 is stored in the dynamic table 200 in the column memory address 206. The memory address 'X0005' is the address where the conditional clause is met and the search result is identified. Subsequently, when the search query QID2 is received in the database, a determination is made to validate if the table 'RV_TB' was modified since its table identifier was last stored in the dynamic table 200. If the determination is made that the table 'RV_TB' was modified since its table identifier was last stored in the dynamic table 200, a value 'yes' is stored in field 220 corresponding to table modified column 208. The result of executing the search query QID2 214 is recorded in the field 222 of column search successful 210. If the search is successful for the search query QID2, a value of 'yes' is stored in field 222 corresponding to the column search successful 210. A count of the successful search query is also maintained in the column count 212. For example, since the search query QID2 214 is successful, count of the successful search query QID2 214 is stored as '1' in field 224.

Whenever a subsequent search query is received in the database, the query ID of the received search query is matched with the values stored in the query ID 202. If a match is found, a validation is performed to determine whether the table 'RV_TB' 216 is modified. If the column table modified 208 indicates 'no' in the field 220, and if the column search successful 210 field indicates 'yes' in the field 222, it is determined whether the diagonal search execution plan is not available for execution of the query ID QID2. Upon determining that the diagonal search execution plan is available, the received search query can be executed from the memory address 'X005' 218 stored in the dynamic table 200. The dynamic table 200 can be used as a quick reference for any search query to determine if a previously successful search was performed for a specific query ID. If a successful search is performed for the query ID, then a dynamic diagonal search can be performed from the memory address stored in the column memory address 206 instead of a starting memory address of the table. Validating table modification and determining if the search is successful is collectively referred to as dynamic search criteria.

A unique query ID is assigned based on the table and conditional clauses in the query. For example, a query ID such as QID2 is assigned since the table accessed is 'RV_TB' and the conditional clause is country='Japan'. The memory address 'X0005' 218 is stored in the field corresponding to the query ID QID2. When another query as shown below is received:

SELECT * FROM "RV_ TB" WHERE: COUNTRY= 'JAPAN' AND
POPULATION = '300'                              ..... (QID2)

In the above query, table queried is 'RV_TB' and the 'where' conditional clause is COUNTRY='JAPAN'. This is same or similar to the table queried and the 'where' conditional clause in query QID2. The above query is analyzed to determine if there are additional conditional clauses. Accordingly, it is determined that an additional conditional clause POPULATION='150' is available with an 'AND' clause. Since the above query is same or similar to QID2 with the additional conditional 'AND' clause, the above query may be treated as a sub-query of the query QID2. Sub-query may share the same query of parent, therefore, the above sub-query may share the same query ID of parent QID2, and hence is assigned the same query ID. For example, when the above query is executed, a diagonal search may be performed from the memory address 'X0005' 218, since the first conditional clause COUNTRY='JAPAN' remains the same. The additional condition clause POPULATION='300' further narrows this search, and hence searching from the memory address 'X0005' holds good resulting in a desired search with 'no records found' result.

When, a query as shown below is received:

SELECT * FROM "RV_ TB" WHERE COUNTRY= 'JAPAN' OR
POPULATION = '300'                              ..... (QID3)

In the above query, table queried is 'RV_TB' and the 'where' conditional clause is COUNTRY='JAPAN'. This is same or similar to the table queried and the 'where' conditional clause in query QID2. The above query is analyzed to determine if there are additional conditional clauses. Accordingly, it is determined that an additional conditional clause POPULATION='150' is available with an 'OR' clause. Since the above query is same or similar to QID2 with the additional conditional 'OR' clause, the above query may be not be treated as a sub-query of the query QID2. The additional 'OR' clause does not narrow the search of the query QID2. The above may not share the same query of parent, and hence is assigned a new query ID QID3. For example, when the above query is executed, a diagonal search cannot be performed from the memory address 'X0005' 218, since the second conditional 'OR' clause POPULATION='300' is at memory address 'X0002' (as shown in FIG. 1). In this case search has to be performed from the beginning of the table to scan the memory location 'X0002' and 'X0005', therefore, scanning just from the memory address 'X0005' does not hold good. Therefore, the query QID3 is executed from the starting memory address 'X0001' of the table.

Figure 3:
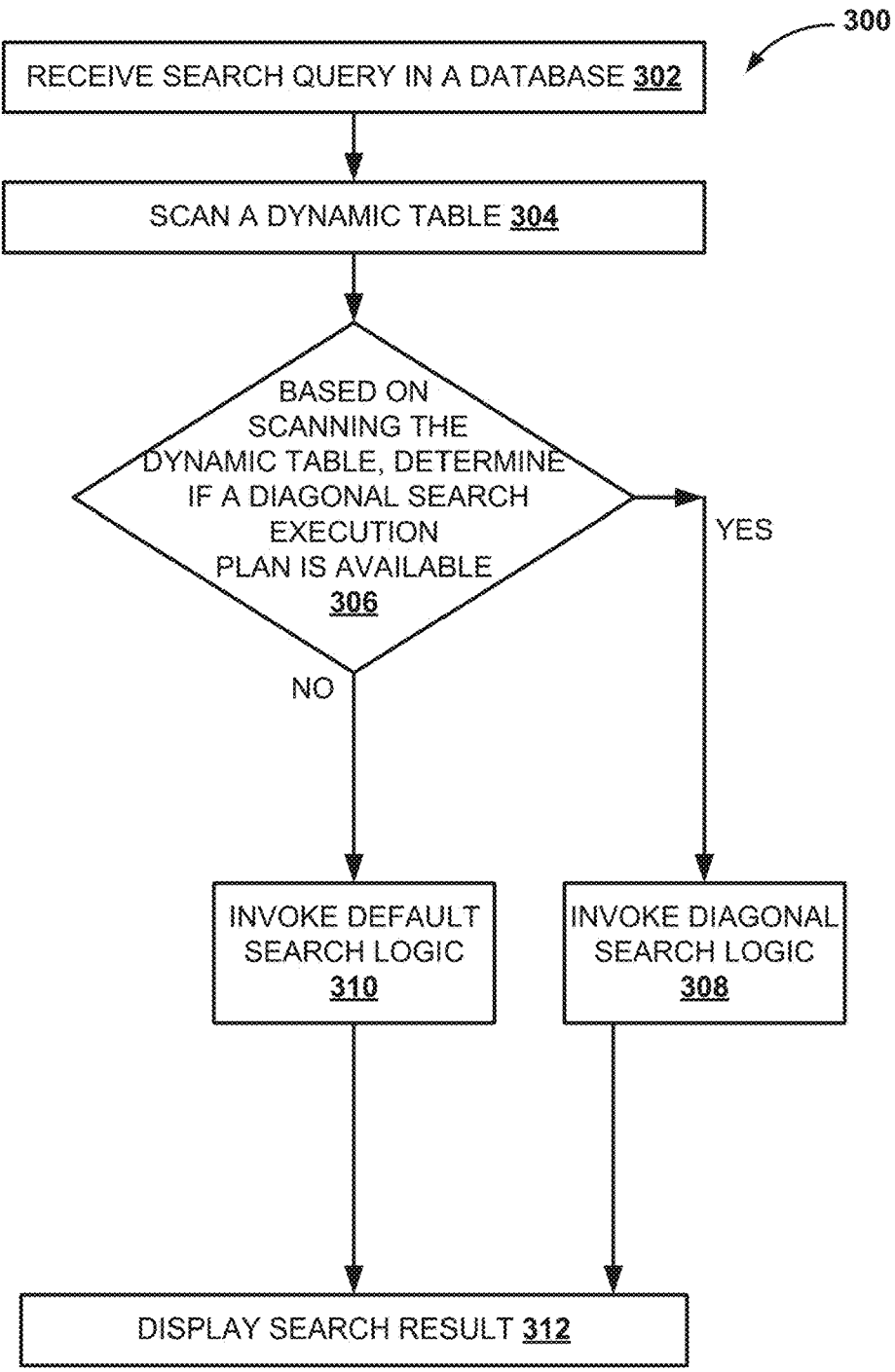
FIG. 3 is a flow diagram illustrating dynamic diagonal search in a database, according to one embodiment.

FIG. 3 is a flow diagram illustrating process 300 to search a database, according to one embodiment. At 302, a search query is received in a database, to query a table. The search query is identified by a query ID. The search query may be in a structured query language (SQL) or other query language. When the search query is received in the database, at 304, a dynamic table is scanned as explained in FIG. 2. When the dynamic table is scanned, the query ID of the received search query is matched with the query IDs stored in the dynamic table. If a match is found, dynamic search criteria are applied such as, a validation is performed to determine whether the table to be queried is modified or not. If the table modified field indicates no modification, and if the search corresponding to the matched query ID indicates successful search, at 306, it is determined whether a diagonal search execution plan is available for the query ID.

If it is determined that the diagonal search execution plan is available, at 308, a diagonal search logic can be invoked. Based on the diagonal search execution plan, the diagonal search logic is applied for the received search query. Diagonal search logic is applied on the table from a memory address retrieved from the dynamic table. Diagonal search is performed on the table stored in a database, and a search result is retrieved from the table. If it is determined that the diagonal search execution plan is not available, at 310, a set of default execution plans is used to access or query the database. The default search logic is provided by the default search execution plan. The default search logic is available in a search engine, and the diagonal search logic is plugged into the search engine. Based on the default search execution plan, the default search logic such as row scan or column scan is applied for the received search query. The default search logic is applied on the table stored in the database, and a search result is retrieved from the table. At 312, the retrieved search result is displayed in a graphical user interface. The result of execution of the default search logic may be stored in the dynamic table.

In one embodiment, when it is determined that the diagonal search execution plan is available, the memory address retrieved from the dynamic table may be used as a reference to perform the diagonal search. The diagonal search execution plan may include diagonal search logic to determine the best way to split the table into sub-tables to perform diagonal search. The table size may be one of the factors in splitting the table into sub-tables. With the memory address as reference, the table may be split into one or more sub-tables, and diagonal search may be performed on the sub-tables in parallel. The diagonal search is efficient and faster compared to row search or column search since the diagonal search is performed in parallel on the sub-tables.

FIG. 4 is an exemplary table 400 illustrating dynamic diagonal search in a database, according to one embodiment. Consider table 400 with fields or columns such as country 402, population 404, sales growth % 406 and area of max growth 408. Upon determining that a diagonal search execution plan is available, e.g., by scanning a dynamic table, diagonal search logic is applied on the table 400. Based on a memory address, e.g., identified in the dynamic table, the diagonal search execution plan may determine that a diagonal search has to be performed. For example, if the starting memory address identified from the dynamic table is 'X0001', the diagonal search execution plan determines that the diagonal search or scan is to be performed from memory location 'X0001'. Accordingly, country 'India' 410 in row 412 is scanned first, and the data pointer is incremented by '5', and population '200' 414 in row 416 is scanned. Subsequently, the data pointer is incremented by '5', and sales growth % '20' 418 in row 420 is scanned, and then area of max growth 'Beijing' 422 in row 424 is diagonally scanned. The diagonal scan gives visual appearances of left to right diagonal scan in a user interface. Increment in data pointer may be automatically determined based on the number of columns in the table. Since there are 4 columns in the table 400, the data pointer is incremented by '5'.

For example, if the starting memory address identified from the dynamic table is 'X0004', the diagonal search execution plan determines that the diagonal scan is to be performed from memory location 'X0004'. Accordingly, area of max growth 'Delhi' 426 in row 412 is scanned first, and the data pointer is incremented by '5', and sales growth % '40' 428 in row 416 is scanned. Subsequently, the data pointer is incremented by '5', and population '150' 430 in row 420 is diagonally scanned, and then country 'China' 432 in row 424 is diagonally scanned. The diagonal scan gives a visual appearance of tight to left diagonal scan in the user interface.

In one embodiment, the diagonal search execution plan may determine that multiple diagonal scans may be performed simultaneously on the table. For example, consider a query as shown below:

```
SELECT * FROM "RV_ TB" WHERE COUNTRY= 'NEPAL'
AND POPULATION= '150' AND SALES= '20' AND AREA =
'DAMAK' ........ (QID4)
```

The memory address 'X0001' may be identified in the dynamic table. The diagonal search execution plan may determine that multiple simultaneous diagonal scans would be appropriate for the query QID4. The simultaneous diagonal scans are initiated from memory address 'X0001', and the memory address 'X0004'. The diagonal scan from the memory address 'X0001' increments the data pointer and reaches the memory address 'X0011' where it finds a conditional clause sales growth='20' 418 in memory location 'X0011' in row 420. Simultaneously, the diagonal scan from the memory address 'X0004' increments the data pointer and reaches the memory address 'X0010' where it finds a conditional clause population='150' 430 in memory location 'X0010' in row 420. Since the diagonal scans have identified conditional clauses in the row 420, the diagonal search execution plan determines that a row scan would be appropriate. Therefore, the row scan is performed on the row 420 to retrieve a search result. In the execution of query QID4, the diagonal scan from the memory address 'X0001' involves '2' data pointer movements in the table such as X0001→X0006→X0011, the other diagonal scan involves '2' data pointer movement in the table such as X0004→X0007→X0010, and the row scan from memory location X0011 to X0012 involves data pointer movement and from memory location X0010 to X0009 involves '1' data pointer movement. This results in a total of '2'+'2'+'1'+'1'='6' data pointer movement in the table. The time taken for the data pointer movement is much lesser in simultaneous diagonal search leading to faster search.

Figure 5:
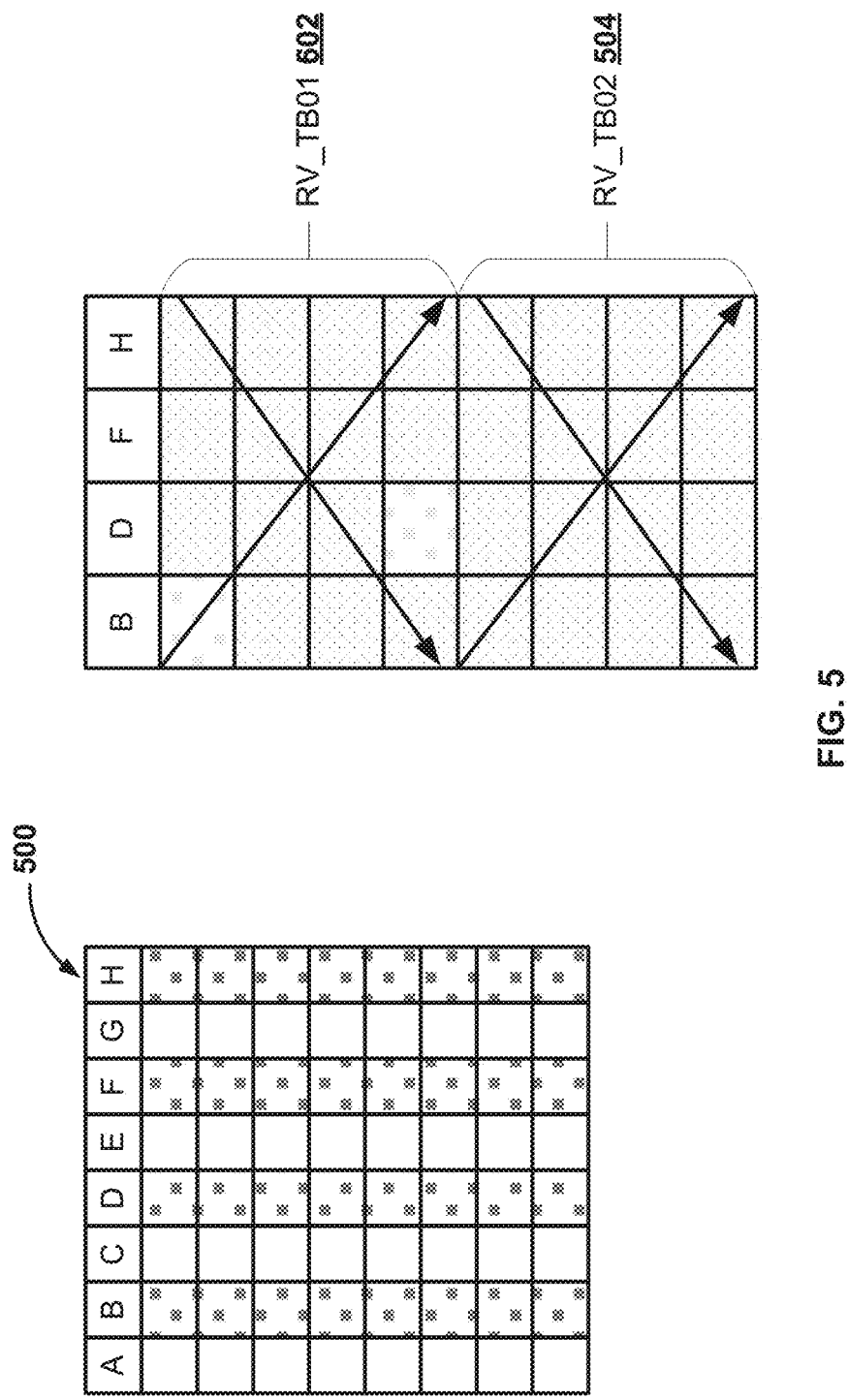
FIG. 5 shows a table illustrating dynamic diagonal search in a table based on select clause, according to one embodiment.

FIG. 5 shows table 500 illustrating dynamic diagonal search based on select clause, according to one embodiment. Consider table 500 with columns A, B, C, D, E, F. G and H. For example, consider a query as shown below:

SELECT B,D,F,H FROM "RV_TB"    (QID5)

Upon determining that a diagonal search execution plan is available on scanning a dynamic table, diagonal search logic is applied on the table 500. Based on the starting memory address identified in the dynamic table, the diagonal search execution plan determines that multiple diagonal searches can be simultaneously performed on the table 500. The diagonal search execution plan analyses the query QID5, and determines that the table 500 may be split into a sub-table based on the columns in the select statement. Further, if size of the table 500 exceeds a certain length, the table 500 may be split further into sub-tables. For example, since the query QID5 refers to columns B, D, F and H in the table 'RV_TB', the columns in the select clause are used to split into sub-table 'RV_TB01' as shown in 502, and 'RV_TB02' as shown in 504. The selected columns with a few rows are in sub-table 'RV_TB01' and the selected columns with remaining rows are in sub-table 'RV_TB02'. Diagonal scan is independently performed on the sub-table 'RV_TB01' and sub-table 'RV_TB02'. Multiple diagonal searches can be simultaneously performed on the sub-table 'RV_TB01' and sub-table 'RV_TB02'. This way the diagonal searches are performed in parallel on the two split sub tables 'RV_TB01' and 'RV_TB02'.

Figure 6A:
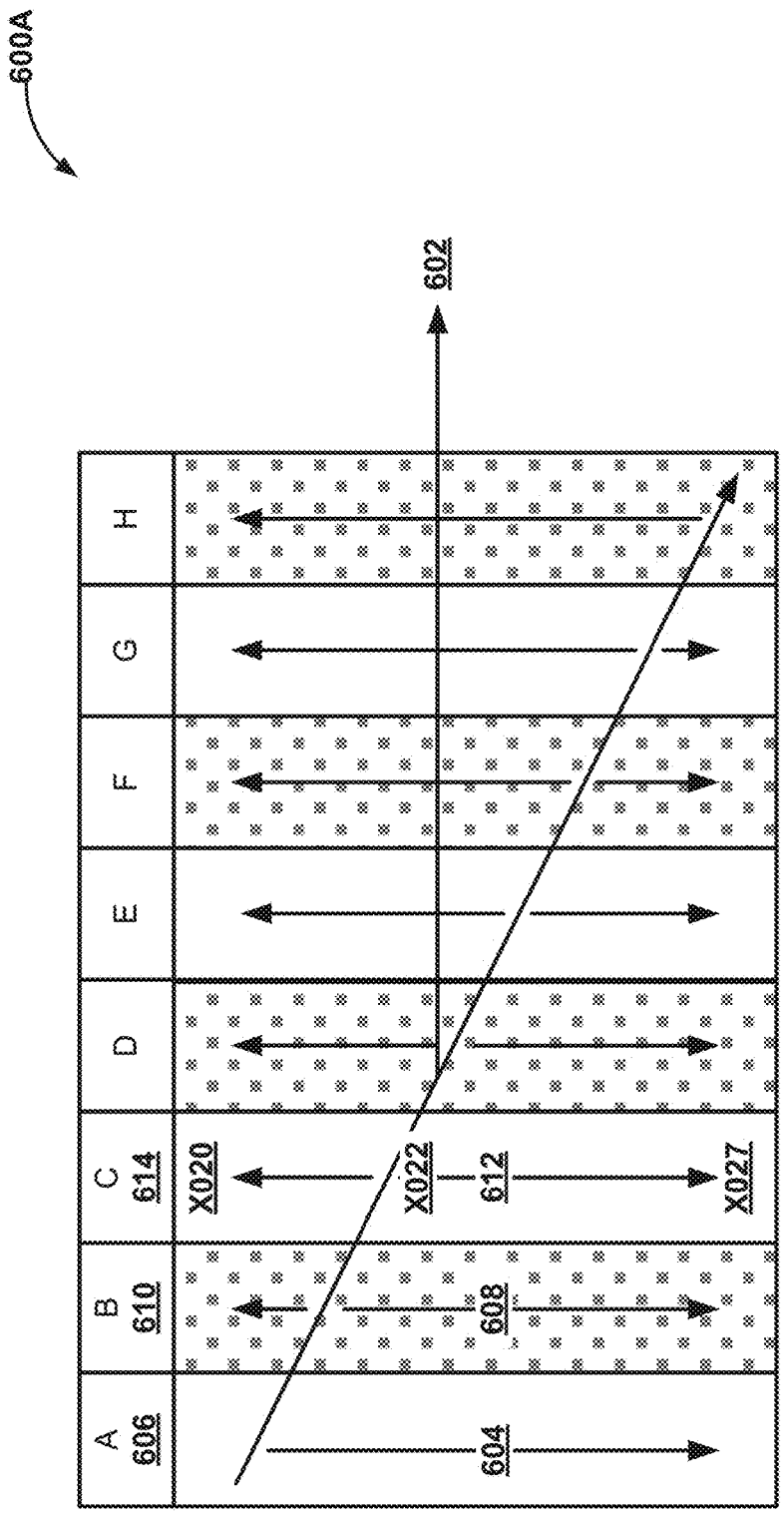
FIG. 6A shows a column store table illustrating dynamic diagonal, according to one embodiment.

FIG. 6A shows column store table 600A illustrating dynamic diagonal search, according to one embodiment. Upon determining that a diagonal search execution plan is available on scanning a dynamic table, diagonal search logic is applied on the table 600A. Based on a starting memory address identified in the dynamic table, the diagonal search execution plan determines that a diagonal search can be performed on the table 600A. For example, when we receive a search query to perform aggregation on the table 600A, a full table scan has to be performed in the column store table 600A. A diagonal search is initiated on the table 600A that scans the column store table in a left to right manner. The diagonal search is initiated as a main thread. This diagonal search inherently initiates multiple parallel threads or column scans on the individual columns. The multiple parallel column scans are initiated as parallel threads. For example, in the table 600A, diagonal search 602 is performed on the table 600A, and the diagonal search 602 initiates parallel column scan 604 on column A 606, parallel column scan 608 on column B 610, parallel column scan 612 on column C 614, etc. Multiple parallel scans may be bidirectional depending on the diagonal search logic configured. For example, the parallel scan in the column 612, may be performed in both the directions from the memory address X022 to the memory address X027, and from the memory address X022 to the memory address X020. Scanning the column store table 600A is faster and the dependency between the individual scans is also reduced.

Figure 6B:
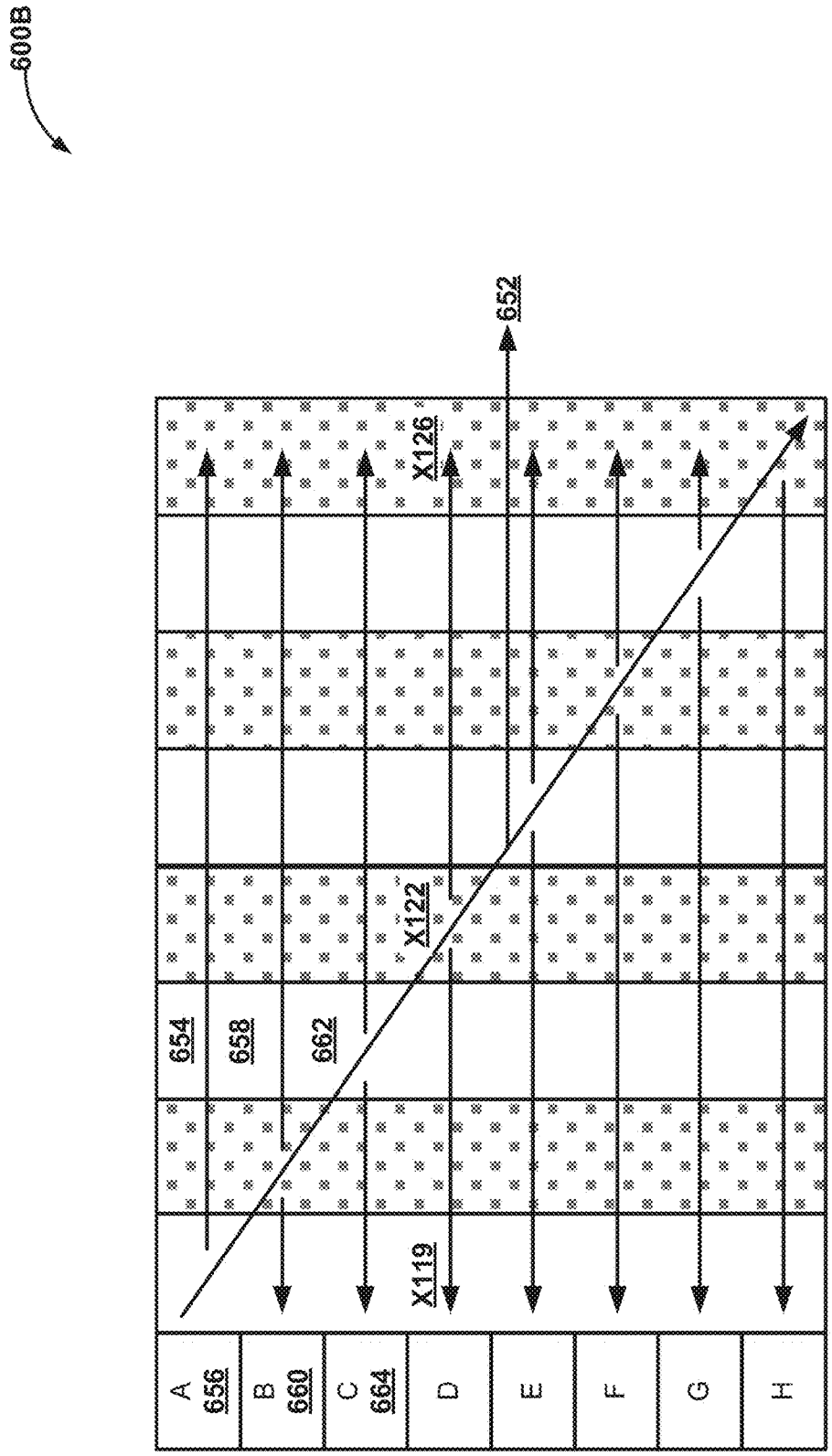
FIG. 6B shows a row store table using dynamic diagonal search, according to one embodiment.

FIG. 6B shows row store table 600B illustrating dynamic diagonal search, according to one embodiment. Upon determining that a diagonal search execution plan is available on scanning a dynamic table, diagonal search logic is applied on the table 600B. Based on a starting memory address identified in the dynamic table, the diagonal search execution plan determines that a diagonal search can to be performed on the table 600B. For example, when we receive a search query to perform aggregation on the table 600B, a full table scan has to be performed in the row store table 600B. For example, in the table 600B, diagonal search 652 is performed on the table 600B, and the diagonal search 652 initiates parallel row scan 654 in row A 656, parallel row scan 658 is initiated on row B 660, parallel scan 662 is initiated on row C 664, etc. The diagonal search is initiated as a main thread. Multiple parallel scans may be bidirectional depending on the diagonal search logic configured. The multiple parallel scans are initiated as parallel threads. For example, the parallel scan in the row 664, may be performed in both the directions from the memory address X122 to the memory address X126, and from the memory address X122 to the memory address X119. Scanning of the row store table 600B is faster and the dependency between the individual scans is also reduced.

Figure 7:
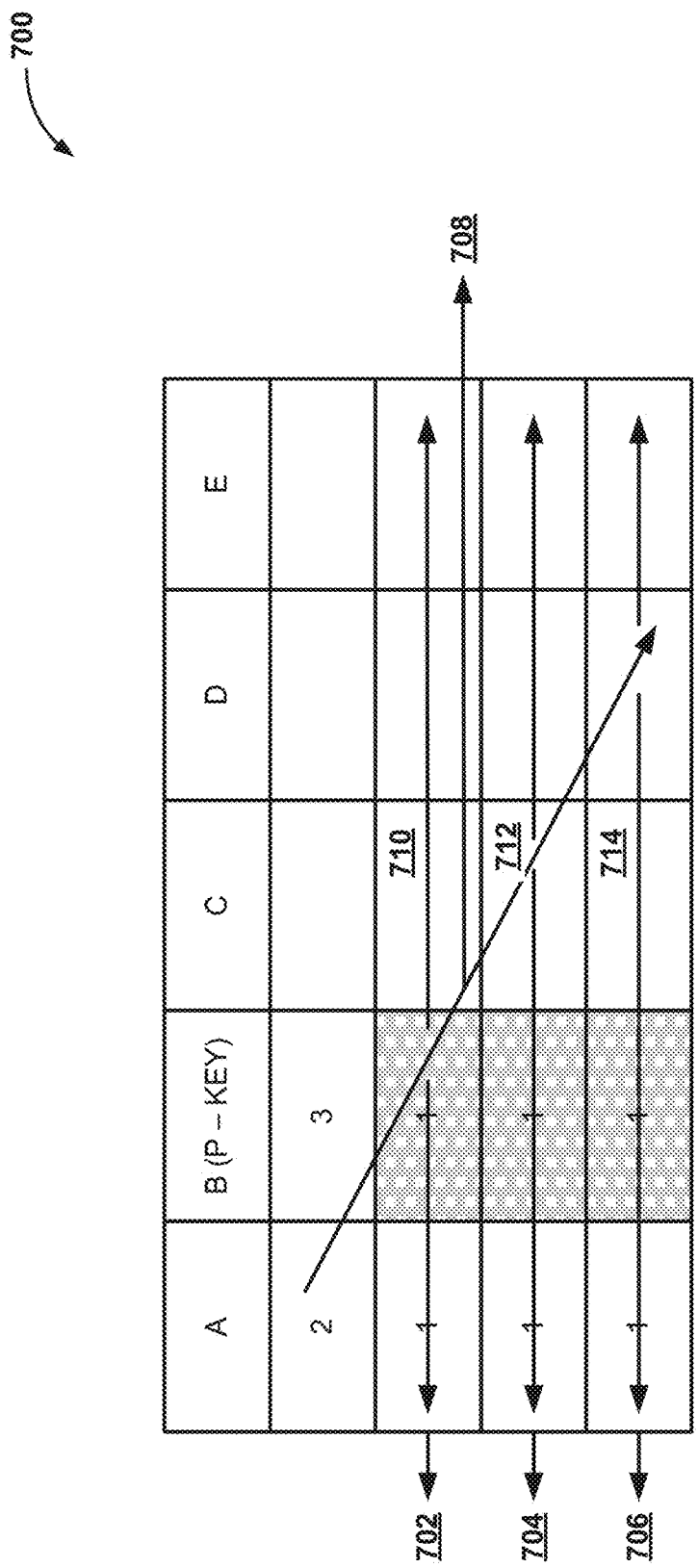
FIG. 7 shows table illustrating dynamic diagonal search, according to one embodiment.

FIG. 7 shows table 700 illustrating dynamic diagonal search, according to one embodiment. Upon determining that a diagonal search execution plan is available on scanning a dynamic table, diagonal search logic is applied on the table 700. Based on a starting memory address identified in the dynamic table, the diagonal search execution plan determines that a diagonal search can to be performed on the table 700. For example, when we receive a search query as shown below:

SELECT*FROM "RV_TB" WHERE *A*='1' AND
*B*='1' (QID5)

the diagonal search execution plan determines the conditional clause A='1' and B='1', and further determines that a primary key is defined on column B. Since the primary key is defined on the column B, range scan can be initiated in parallel along with the diagonal search. The diagonal search logic in the diagonal search execution plan is used to perform range scan along with the diagonal search. The range scan is performed on rows 702, 704 and 706 since the conditional clause B='1' is satisfied for these rows. The diagonal search 708 inherently initiates multiple parallel range scans on the individual rows 702, 704 and 706. The diagonal search is initiated as a main thread. The diagonal search 708 initiates parallel range scan 710 in row 702, parallel range scan 712 in row B 704, and parallel range scan 714 in row 706. Multiple parallel range scans may be bidirectional depending on the diagonal search logic configured. The multiple parallel column scans are initiated as parallel threads. Scanning of the table 700 is faster and the dependency between the individual scans is also reduced.

Figure 8:
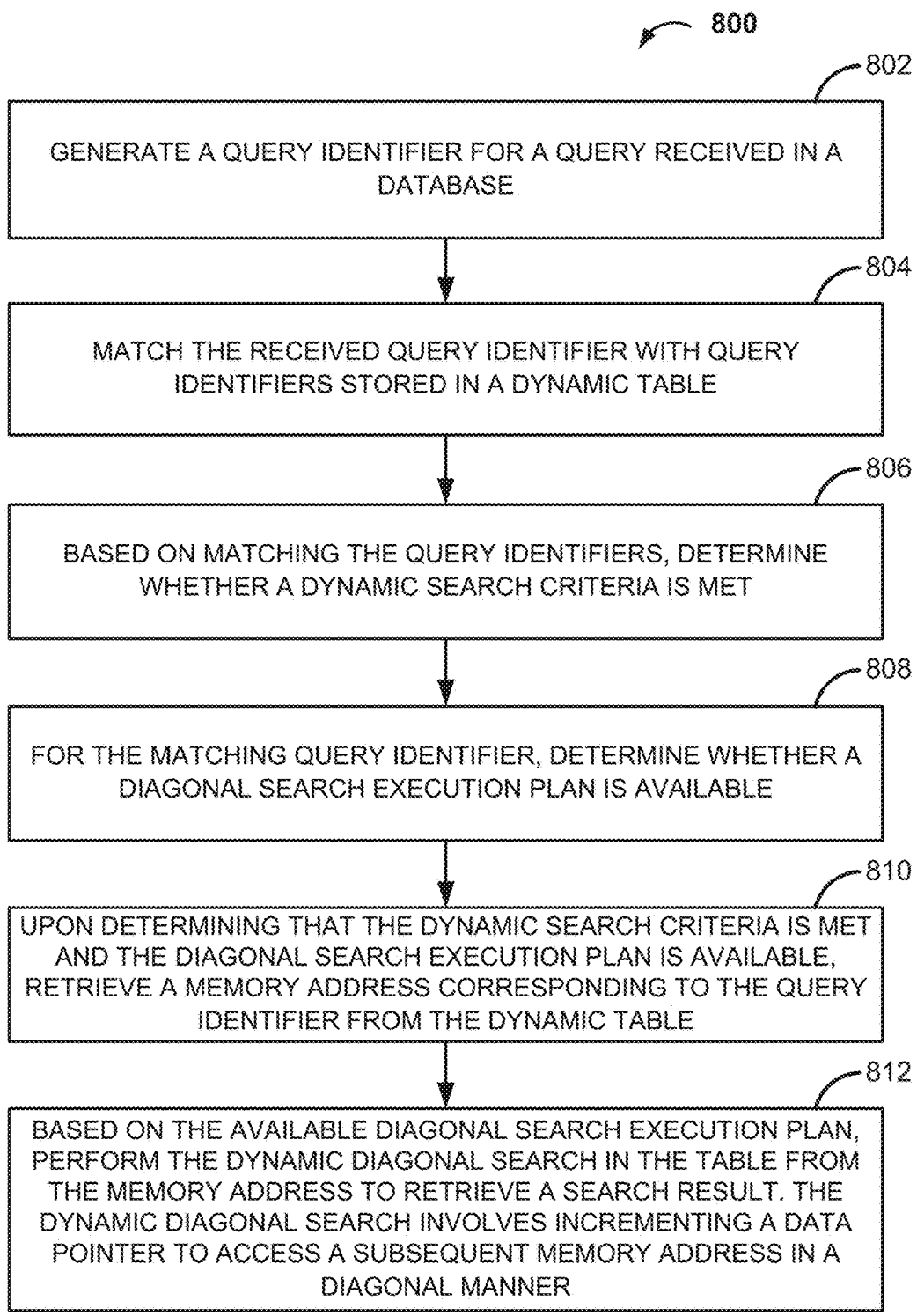
FIG. 8 is a flow chart, illustrating a process of dynamic diagonal search in database, according to one embodiment.

FIG. 8 is a flow chart 800, illustrating a process of dynamic diagonal search in database, according to one embodiment. At 802, a query identifier is generated for a query received in a database. At 804, the received query identifier is matched with query identifiers stored in a dynamic table. At 806, it is determined whether a dynamic search criteria are met based on matching the query identifiers in the dynamic table. For the matching query identifier, at 808, it is determined whether a dynamic search execution plan is available. Upon determining that the dynamic search criteria are met and the dynamic search execution plan, at 810, a memory address corresponding to the query identifier is retrieved from the dynamic table. At 812, based on the available diagonal search execution plan, the dynamic diagonal search is performed in the table from the memory address to retrieve a search result. The dynamic diagonal search involves incrementing a data pointer to access a subsequent memory address in a diagonal manner in the table. The diagonal search logic and embodiments described above are merely exemplary.

Figure 9:
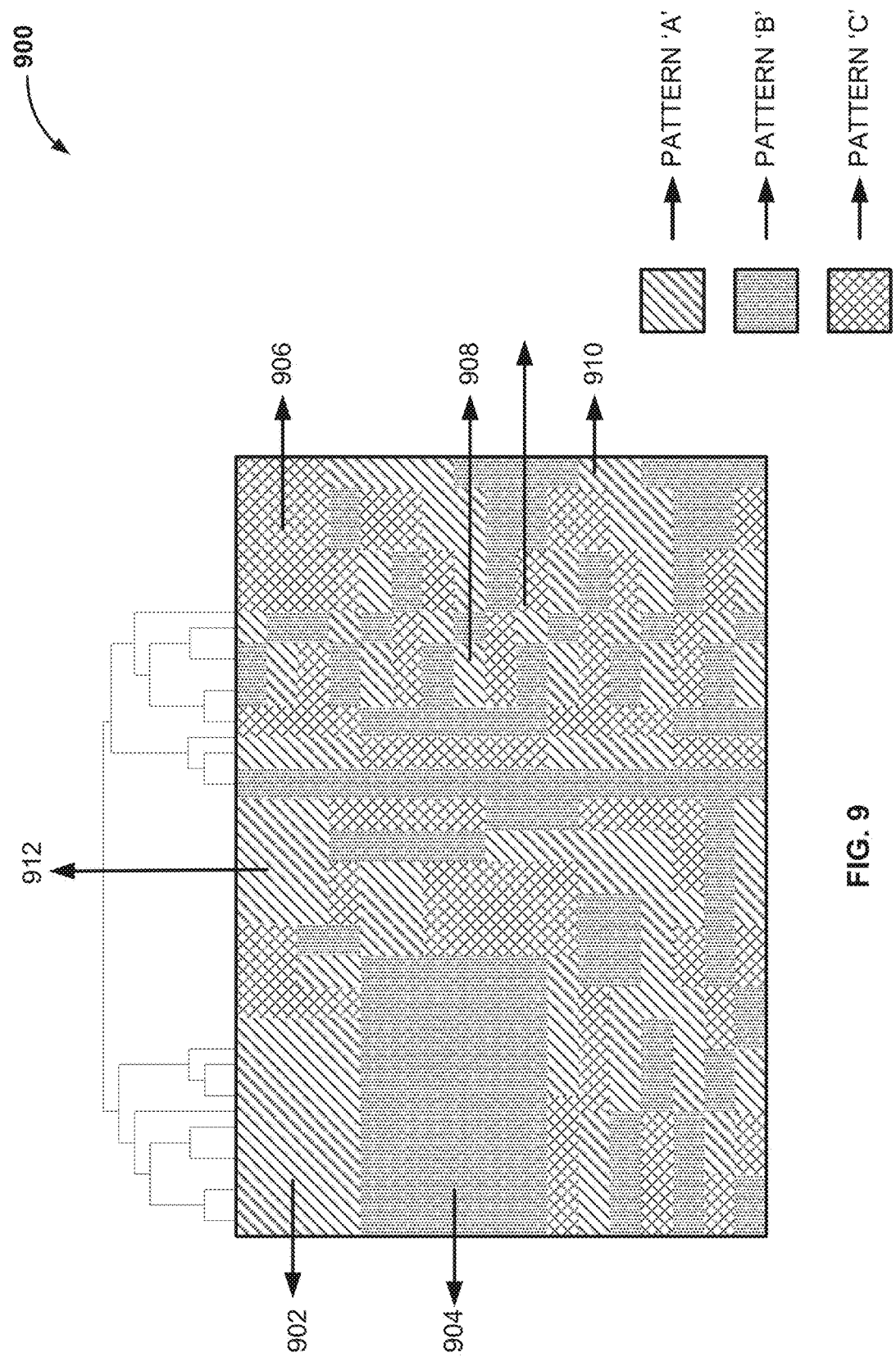
FIG. 9 is an exemplary heat map of a database, according to one embodiment.

FIG. 9 is an exemplary heat map 900 of a database, according to one embodiment. Color coded or pattern coded representation of memory addresses of a database in a matrix format is referred to as heat map. Individual tables in the database are stored in physical locations in a hard disc or other storage. Individual cells in the individual tables are stored in specific memory addresses in the hard disc storage. As explained in FIG. 2, a count of successful search query is maintained in a field 'count' in a dynamic table. A threshold value is associated with the count. The threshold value associated with the count indicates a frequency pattern of values stored in the memory addresses. When the count associated with the search query is above the threshold value for e.g. '100', memory location associated with the starting memory address is indicated in the frequency pattern such as pattern 'A'. Pattern 'A' may be associated with a color code red indicating that it is a frequently searched location. When the count associated with the search query is between a certain range for e.g. '1'-'5', memory location associated with the starting memory address is indicated in the frequency pattern such as pattern 'B'. Pattern 'B' may be associated with a color code green indicating that it is a sparsely searched location, and when the count associated with the search query is value such as '0', memory location associated with the starting memory address is indicated in the frequency pattern such as pattern 'C'. Pattern 'C' may be associated with a color code black indicating that the memory location was never searched. The color coded memory address of the database is represented as the heat map 900 of the database.

For example, section 902 of memory locations is in pattern 'A' indicating frequently accessed data with most successful search attempts. Section 404 of memory locations is in pattern 'B' indicating less frequently accessed data with few successful search attempts. Section 906 of memory locations is in pattern 'C' indicating data never accessed with no successful search attempts. The information in the heat map is consolidated over a period of time, and diagonal search may be performed leading to faster successful search attempts. The heat map can be used as a basis for defragmentation of the database. The defragmentation may be performed at a memory address/cell level based on the frequency pattern. For example, pattern 'A' cells shown in location 908 and 910 may be defragmented to contiguous storage location as shown in 912 so that the search yields faster results. Once data is defragmented to contiguous storage locations, data pointer increment is minimized, thereby improving speed of data access. Whenever a memory location is defragmented and moved to a new memory location, the new memory location is updated in the dynamic table in the field memory address.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
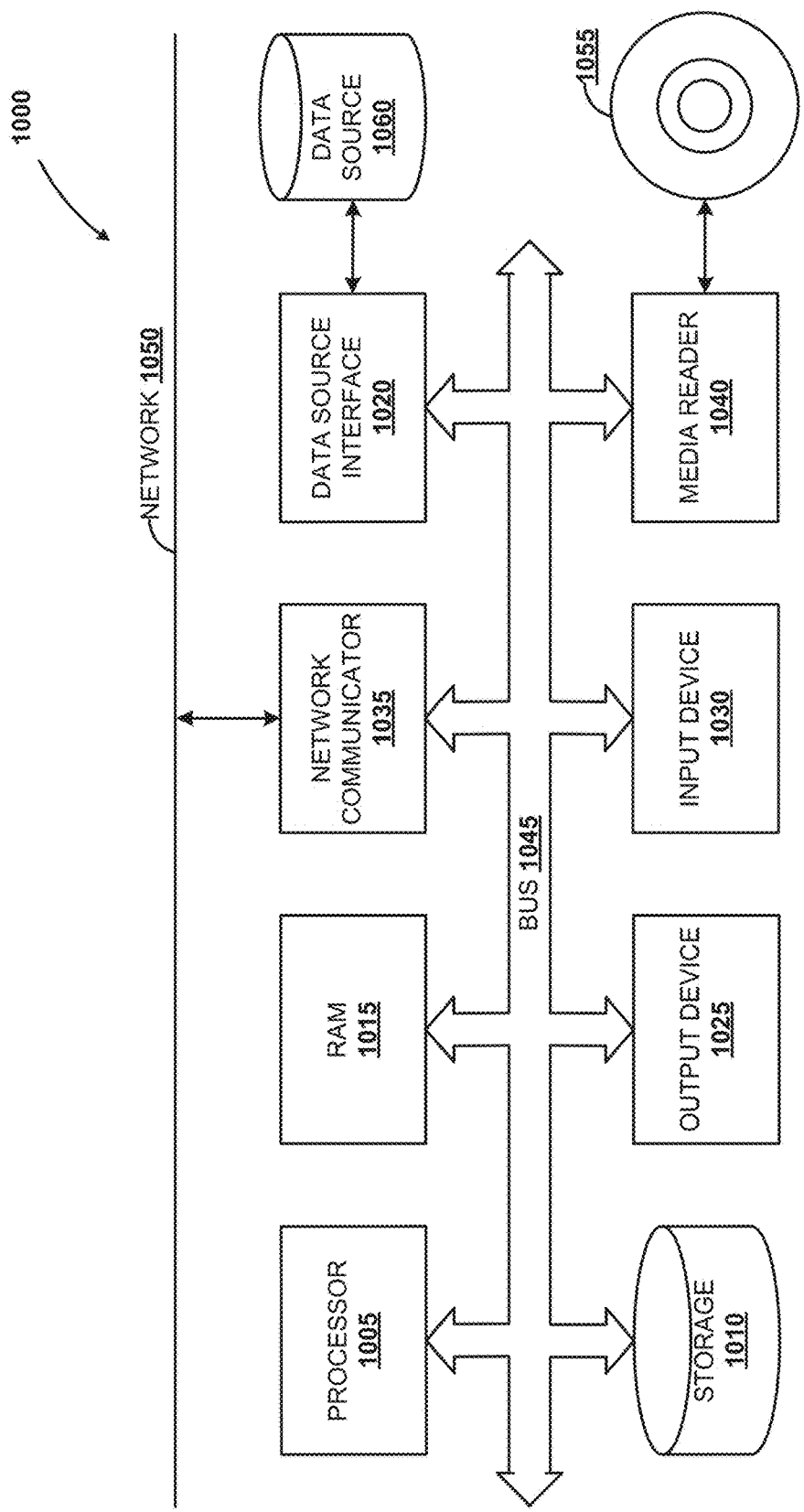
FIG. 10 is a block diagram of an exemplary computer system, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   generate a query identifier for a query received in a database;
   match the received query identifier with query identifiers stored in a dynamic table;
   based on matching the query identifier, determine whether a diagonal search execution plan is available; and
   based on the available diagonal search execution plan, perform a dynamic diagonal search in a table in the database to retrieve a search result, wherein the dynamic diagonal search involves incrementing a data pointer to access a subsequent memory address in a diagonal manner.

2. The non-transitory computer-readable medium of claim 1, further comprises instructions which when executed by the computer further cause the computer to:
 for the matching query identifier, determine whether a dynamic search criteria are met;
 upon determining that the dynamic search criteria are met, retrieve a memory address corresponding to the query identifier from the dynamic table; and
 based on the available diagonal search execution plan, perform the dynamic diagonal search in the table from the memory address to retrieve search result.

3. The non-transitory computer-readable medium of claim 1, further comprises instructions which when executed by the computer further cause the computer to:
 upon determining that the diagonal search execution plan is not available, perform search in the table with a default search logic to retrieve the search result.

4. The non-transitory computer-readable medium of claim 1, wherein the execution plan further comprises instructions which when executed by the computer further cause the computer to:
 perform the dynamic diagonal search as a main thread in a columnar table, wherein the dynamic diagonal search inherently initiates multiple parallel threads of column search on individual columns in the columnar table; and
 retrieve the search result from the columnar table.

5. The non-transitory computer-readable medium of claim 1, further comprises instructions which when executed by the computer further cause the computer to:
 perform the dynamic diagonal search as a main thread in a row store table, wherein the dynamic diagonal search inherently initiates multiple parallel threads of row search on specific range of rows in the row store table; and
 retrieve the search result from the columnar table.

6. The non-transitory computer-readable medium of claim 2, further comprises instructions which when executed by the computer further cause the computer to:
 upon determining that the dynamic search criteria are met, increment a count corresponding to the query identifier in the dynamic table; and
 generate a heat map of the database based on the count, wherein a threshold associated with the count indicates a frequency pattern of a value associated with the memory address in the heat map.

7. The non-transitory computer-readable medium of claim 6, further comprises instructions which when executed by the computer further cause the computer to:
 defragment the values based on the frequency pattern in the heat map by moving the value to a contiguous memory address.

8. A computer-implemented method of dynamic diagonal search in a database, the method comprising:
 generating a query identifier for a query received in a database;
 matching the received query identifier with query identifiers;
 based on matching the query identifier, determining whether a diagonal search execution plan is available; and
 based on the available diagonal search execution plan, performing a dynamic diagonal search in a table in the database to retrieve a search result, wherein the dynamic diagonal search involves incrementing a data pointer to access a subsequent memory address in a diagonal manner.

9. The method of claim 8, further comprising:
 for the matching query identifier, determining whether a dynamic search criteria are met;
 upon determining that the dynamic search criteria are met, retrieving a memory address corresponding to the query identifier from the dynamic table; and
 based on the available diagonal search execution plan, performing the dynamic diagonal search in the table from the memory address to retrieve search result.

10. The method of claim 8, further comprising:
 upon determining that the diagonal search execution plan is not available, performing search in the table with a default search logic to retrieve the search result.

11. The method of claim 8, further comprising:
 performing the dynamic diagonal search as a min thread in a columnar table, wherein the dynamic diagonal search inherently initiates multiple parallel threads of column search on individual columns in the columnar table; and
 retrieving the search result from the columnar table.

12. The method of claim 8, further comprising:
 performing the dynamic diagonal search as a main thread in a row store table, wherein the dynamic diagonal search inherently initiates multiple parallel threads of row search on specific range of rows in the row store table; and
 retrieving the search result from the columnar table.

13. The method of claim 9, further comprising:
 upon determining that the dynamic search criteria are met, incrementing a count corresponding to the query identifier in the dynamic table; and
 generating a heat map of the database based on the count, wherein a threshold associated with the count indicates a frequency pattern of a value associated with the memory address in the heat map.

14. The method of claim 13, further comprising:
 defragmenting the values based on the frequency pattern in the heat map by moving the value to a contiguous memory address.

15. A computer system for dynamic diagonal search in databases, comprising:
 a computer memory to store program code; and
 a processor to execute the program code to:
 generate a query identifier for a query received in a database;
 match the received query identifier with query identifiers stored in a dynamic table;
 based on matching the query identifier, determine whether a diagonal search execution plan is available; and
 based on the available diagonal search execution plan, perform a dynamic diagonal search in a table in the database to retrieve a search result, wherein the dynamic diagonal search involves incrementing a data pointer to access a subsequent memory address in a diagonal manner.

16. The system of claim 15, wherein the processor further executes the program code to:
 for the matching query identifier, determine whether a dynamic search criteria are met;
 upon determining that the dynamic search criteria are met, retrieve a memory address corresponding to the query identifier from the dynamic table; and
 based on the available diagonal search execution plan, perform the dynamic diagonal search in the table from the memory address to retrieve search result.

17. The system of claim 15, wherein the processor further executes the program code to:

upon determining that the diagonal search execution plan is not available, perform search in the table with a default search logic to retrieve the search result.

18. The system of claim 15, wherein the processor further executes the program code to:
perform the dynamic diagonal search as a main thread in a columnar table, wherein the dynamic diagonal search inherently initiates multiple parallel threads of column search on individual columns in the columnar table; and
retrieve the search result from the columnar table.

19. The system of claim 18, wherein the processor further executes the program code to:
perform the dynamic diagonal search as a main thread in a row store table, wherein the dynamic diagonal search inherently initiates multiple parallel threads of row search on specific range of rows in the row store table; and
retrieve the search result from the columnar table.

20. The system of claim 16, wherein the processor further executes the program code to:
upon determining that the dynamic search criteria are met, increment a count corresponding to the query identifier in the dynamic table; and
generate a heat map of the database based on the count, wherein a threshold associated with the count indicates a frequency pattern of a value associated with the memory address in the heat map.

* * * * *